No. 841,153. PATENTED JAN. 15, 1907.
J. A. JUST.
APPARATUS FOR DESICCATING MILK.
APPLICATION FILED JULY 11, 1905.
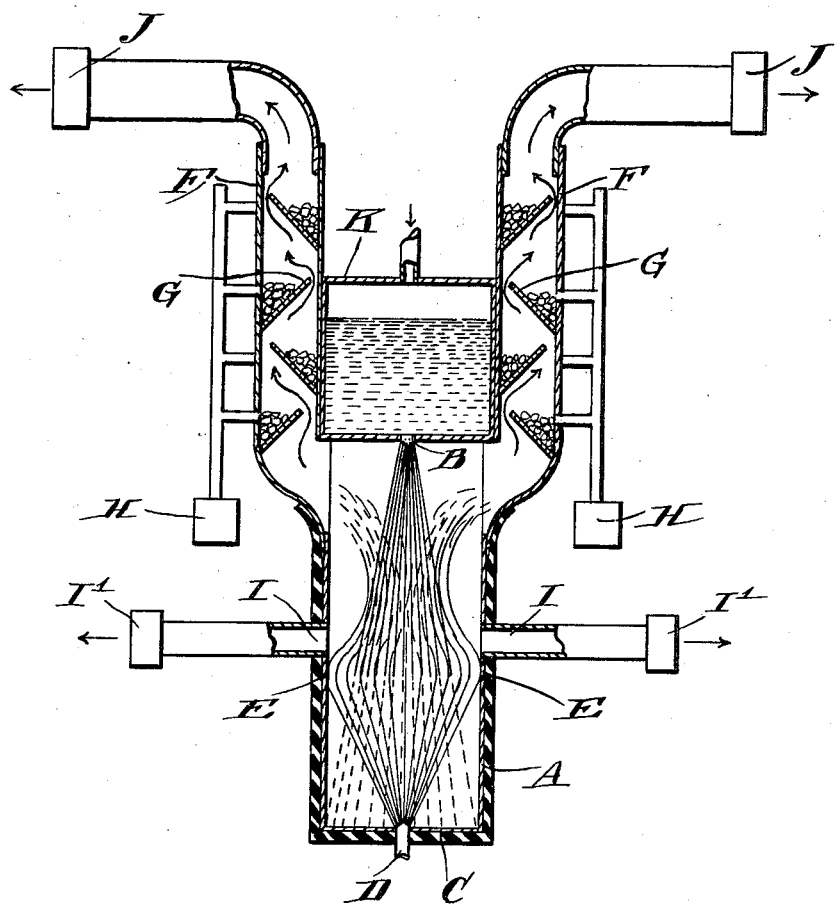
Attest:
Inventor:
John A. Just
by Dickerson, Brown, Raegener & Binney
Attys

UNITED STATES PATENT OFFICE.

JOHN A. JUST, OF PULASKI, NEW YORK.

APPARATUS FOR DESICCATING MILK.

No. 841,153. Specification of Letters Patent. Patented Jan. 15, 1907.

Application filed July 11, 1905. Serial No. 269,165.

*To all whom it may concern:*

Be it known that I, JOHN A. JUST, a citizen of the United States, and a resident of Pulaski, New York, have invented certain new and useful Improvements in Apparatus for Desiccating Milk, of which the following is a specification accompanied by a claim.

This invention relates to apparatus for desiccating milk, and has for its object to reduce the milk to powder in a simple and efficient manner.

In carrying out the invention the milk is injected into a heated atmosphere in a finely-divided condition or in a high state of subdivision, and the powder which is formed is suitably withdrawn from the chamber by a current induced by suitable apparatus.

Further objects of the invention will hereinafter appear; and to these ends the invention consists of a means for carrying out the above objects illustrated by a suitable drawing, in which the figure is a vertical sectional view of apparatus suitable for carrying out the process.

In accordance with this invention the milk is preferably sprayed into the heated atmosphere in such form as to present the greatest surface possible to the action of the heated air, and the incoming heated air is also introduced into the chamber in such manner as to have the maximum effect upon the stream of milk.

I prefer to inject the milk into the chamber A from a suitable nozzle B or from nozzles which direct the streams of milk outwardly in all directions over an area substantially covering the base C of the chamber. I have found that good results are produced by injecting the stream of milk in substantially the form of a widely-diverging conical stream, as illustrated in the drawing, which gradually widens as it leaves the nozzle B, thereby presenting a constantly-increasing cross-sectional area. The heated incoming air is also injected from the nozzle D in a gradually-widening stream or in conical form having a greater angle of divergence than the stream of milk.

The two streams of heated air and milk intersect each other at an angle, as shown, in a plane of substantially maximum area, and at this point the maximum action upon the milk occurs. The outwardly-directed streams of air impinge against the sides of the chamber at E and are thus directed inwardly again, thereby again intersecting the streams of milk and increasing the action of the chamber A.

The hot air containing the water vapor extracted from the milk rises up through the top of the chamber A and is carried off in a longitudinal direction through one or more suitable condensers F, which are preferably provided with supports G for a suitable hygroscopic substance. The water of condensation is collected from the shelves and led to suitable receivers H.

In order to remove the powdered milk from the heated chamber A, outlets I are provided in the chamber-walls at the point where the desiccation is substantially complete, which is at a height adjacent the plane of maximum action just above the points E on the sides of the chamber at which the streams of air impinge. The falling powder is thus withdrawn in a transverse direction from the center toward the sides of the chamber by blowers I' without permitting it to fall to the bottom of the chamber, and the rising currents of air pass inwardly into the hollow central portion of the stream of milk and then upwardly and outwardly through the upper portion of the stream of milk to the condensers F, leaving the water-vapors behind and escaping at the top of the condensers, where suitable fans J may be provided to carry off the air and aid in producing a draft.

The condensers F may be of any suitable character and need not be provided with hygroscopical substance. Preferably also the tank K containing the milk is placed under pressure, as by means of compressed air, to force the milk through the injecting-nozzle B. The temperature of the air should be from about 300° to about 450° Fahrenheit and may be regulated according to the quantity injected. The heated chamber A should be provided with heat-insulating material of any suitable character, and the air may be heated or superheated in any suitable manner.

I claim, and desire to obtain by Letters Patent, the following:

In apparatus for desiccating milk, the combination of a chamber, means for injecting into said chamber a widely-diverging finely-divided stream of milk of constantly-increasing cross-sectional area, means for introducing into said chamber an oppositely-directed heated-air stream of similar character, said streams thereby intersecting in a plane of substantially maximum area at which the maximum action on the milk occurs, means for withdrawing the milk-powder thus formed from the sides of the chamber in a transverse direction at points adjacent to said plane of maximum action, and means for withdrawing the heated air and water-vapor from one end of the chamber in a longitudinal direction.

In testimony whereof I have signed this specification in the presence of two subscribing witnesses.

JOHN A. JUST.

Witnesses:
  JESSIE F. FARMER,
  B. E. PARKHURST.